Patented July 14, 1931

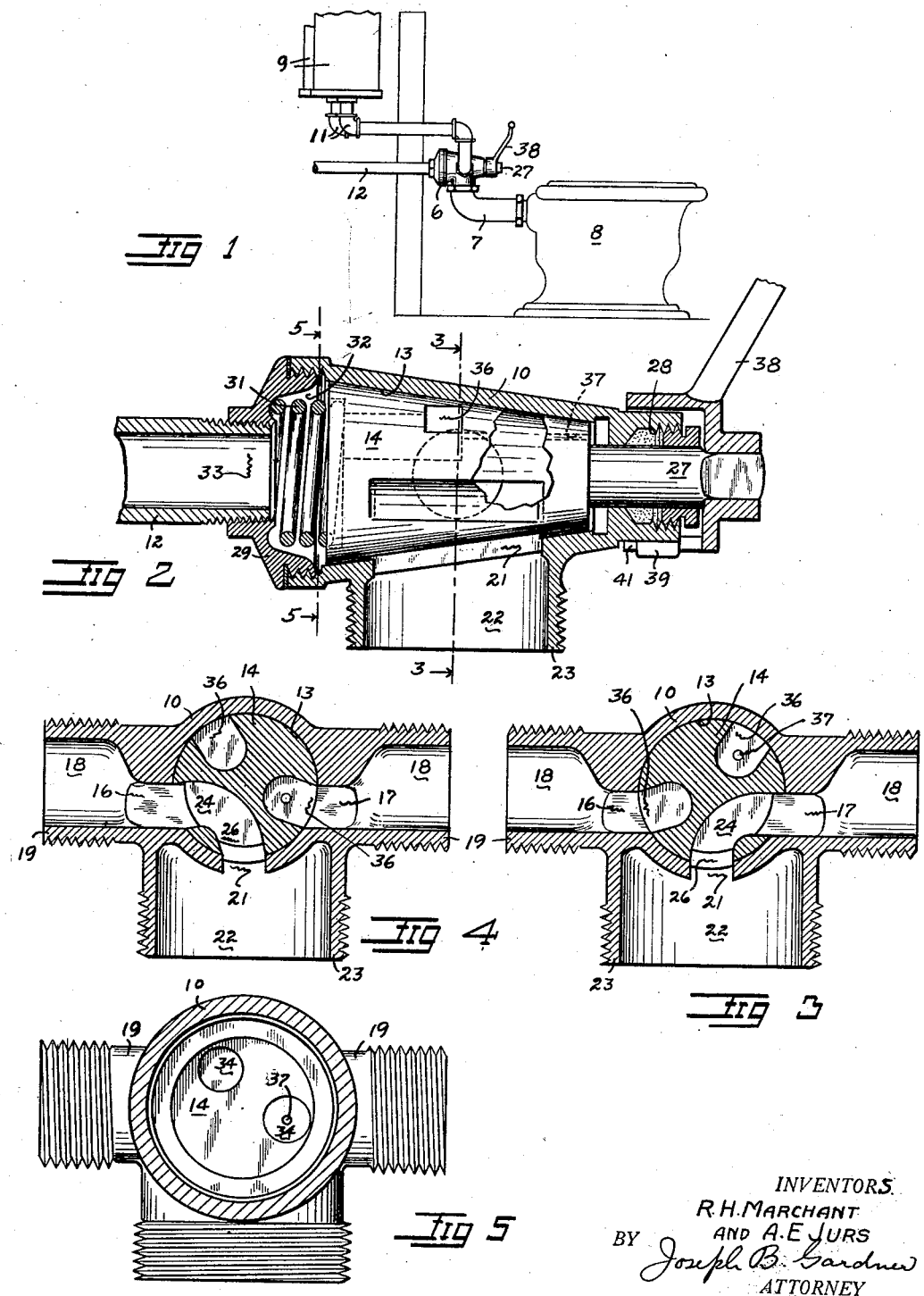

1,814,396

UNITED STATES PATENT OFFICE

RODNEY H. MARCHANT, OF OAKLAND, AND ALBERT E. JURS, OF PIEDMONT, CALIFORNIA, ASSIGNOR TO NATIONAL SANITARY VALVE CORPORATION, OF CARSON CITY, NEVADA, A CORPORATION OF NEVADA

TOILET FLUSH VALVE

Application filed May 7, 1928. Serial No. 275,597.

The invention relates to a toilet flushing valve arranged to be operated to cause the flow of water to and from a pair of tanks in such manner that while one is being filled the other is being emptied into the bowl.

An object of the invention is to provide a simplified and an improved valve of the character described which will control the flow of water to and from the tanks and to the bowl in a particularly efficient manner.

A further object of the invention is to provide in the valve means constantly utilizing the pressure of water in a supply pipe for maintaining the valve plug properly seated in the valve body.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figure 1 is a side view showing the toilet flushing valve of our invention operatively associated with a toilet.

Figure 2 is a longitudinal sectional view of the valve.

Figure 3 is a sectional view taken on the line 3—3 in Figure 2.

Figure 4 is a sectional view similar to that of Figure 3 but with the valve plug positioned in another operative position.

Figure 5 is a sectional view taken on the line 5—5 in Figure 2, but with the valve plug disposed as in Figure 4.

As herewith particularly shown, the toilet flushing valve of the invention comprises a valve 6 operatively connected by means of a pipe 7 to a toilet bowl 8 and to a pair of flush tanks 9 by means of pipes 11. Water is arranged to be supplied from an external source through a pipe 12 which is also operatively connected to the valve.

In the present embodiment of the invention the valve 6 comprises a valve body 10 provided with a conical valve seat 13 in which a valve plug 14 is arranged to rotatably engage. The body 10, it will be noted, is provided mediately thereof with a pair of oppositely disposed like ports 16 and 17 communicating with passages 18 provided in a pair of diametrically opposed body extensions 19, the latter being here shown threaded for connection to the pipes 11. Also provided in the valve body is an outlet port 21 which discharges into the passage 22 of a threaded extension 23 of the body having its axis at right angles to and in coplanar relation with that of the extensions 19 and arranged to be connected to the pipe 7. The ports 16, 17 and 21 are preferably formed as slots extending longitudinally in the seat 13, and are radially disposed about the valve axis in a common plane.

The valve plug 14 which is arranged to cooperate with the various ports is provided with a transverse passage 24 through a side thereof, the ends of said passage providing like ports 26 in the plug. The ports 26 are shaped as are the ports in the seat and are so related circumferentially and axially of the plug that the plug may be positioned for providing an unobstructed passage of water between the port 21 and either one of the ports 16 or 17.

The valve plug 14 is provided with a stem 27 extending axially from the smaller end thereof and engageable in and through a stuffing box 28 provided on the valve body 10 at the smaller end of the seat 13. Closure of the body end at the larger end of the seat 13 is arranged to be effected by means of a screw cap 29 mounted on the body. A helical compression spring 31 is operatively interposed between the plug 14 and cap 29 in the body cavity 32 defined therebetween whereby the plug may be resiliently urged to its fully seated position in the seat 13.

It will now be noted that water is arranged to be supplied to the tanks through and from the cavity 32 between the cap 29 and valve plug 14, and the supply pipe 12 is accordingly connected to said cavity. Preferably, and as disclosed, the cap 29 is utilized for making the necessary connections, and said cap is accordingly here shown provided with a threaded opening 33 whereby the pipe 12 may be threadedly secured thereto.

Extending into the plug from the larger end thereof are passages 34, which passages terminate in ports 36 in the conical surface of the plug. The disposition of the plug ports 36 is such that when the plug is in seated position in the valve body, it may be disposed to place either one of the ports 36 in registration with a body port 16 or 17. The ports 36 are preferably the same width circumferentially of the valve as are the body ports 16 and 17, but need not be as long as these ports. In terms of the plug ports only, the relation of the ports 36 to the plug ports 26 is such that a plane through the ports 36 perpendicular to the axis of the plug will intersect the ports 26.

The body ports 16 and 17 are preferably disposed at equal distances from the outlet port 21 circumferentially of the valve seat 13 and all three ports are arranged to lie within the same half of the seat whereby the other half of the seat is imperforate. The relative dispositions of the various body and plug ports, it will now be noted, is such that when, as shown in Figure 3, the plug is disposed for the flow of water from port 17 through the plug passage 24 and the outlet port 21, one plug port 36 registers with the body port 16, while the other registers with the imperforate half of the plug seat 13. In this manner, while one tank 9 is being emptied, the other tank is being filled from the supply pipe 12. Turning of the plug to the position shown in Figure 4 reverses the action with respect to the two tanks. In this manner, an efficient and positive control of the water flow to and from the tanks is effected.

The present efficient arrangement by which water is arranged to be supplied to the tanks 9 from the body cavity 32 at the larger end of the plug 14 is also arranged to provide for utilizing the water pressure in the supply pipes to maintain the plug forcibly seated in the valve seat 13. Preferably, and as shown, the plug 14 is provided with a duct 37 extending longitudinally therethrough, whereby the unit pressure existing in the cavity 32 is exerted against both ends of the plug, and the effective seating pressure for the plug is the difference in the total axial pressures at the two plug ends. This seating pressure is arranged to be very much more than that exerted by the spring 31 whereby such spring is necessary only when substantially no pressure exists in the supply pipe, as when the valve is out of service, and then functions merely to hold the valve in its seat. The seating pressure thus provided for the valve automatically varies with the pressure in the cavity 32 whereby the valve is arranged to be held seated at all times with a force requisite to insure a properly seated engagement thereof with the seat 13.

The valve plug 14, it will be noted, is arranged to be oscillated through a limited arc by means of a lever or handle 38 secured to the extending end of the valve stem 27, and the allowed arc of rotation of the valve plug is substantially limited to the rotative motion necessary to turn the plug between the positions shown in Figures 3 and 4, cooperating stops 39 and 41 being here shown respectively provided on the valve body and on a portion of the handle structure to effect such limitation. With the present structure, the arc of movement of the handle 38 is less than 90 degrees of arc, such being generally preferable.

We claim:

1. A valve comprising a casing defining a cavity providing a conical seat for a valve plug, a pair of transversely opposed ports in said seat, an outlet port in said seat, a conical valve plug turnably mounted in said seat, an intake leading to the casing cavity at a portion thereof other than at said seat, and port means in said plug for alternately connecting said first ports with said outlet port and said inlet, said port means comprising separate passages extending from the larger end of the plug valve through and opening on opposite sides of the valve, and a passage extending transversely through the plug and independent of said separate passages.

2. A valve comprising a casing defining a cavity providing a seat for a valve plug, a pair of transversely opposed ports in said seat, an outlet port in said seat, a frusto-conical valve plug turnably mounted in said seat, a fluid intake opening into said cavity at a point opposite the larger end of said valve plug, and port means in said plug for alternately connecting said first ports with said outlet port and said inlet, said port means comprising spaced passages extending from a point in the plug opposite the fluid intake to points on the conical seated surface of the plug, and a passage extending transversely through a portion of said plug, and a passage leading through the plug from one of said spaced passages to the end of the plug furthest removed from said fluid intake.

In testimony whereof, we have hereunto set our hands at Oakland, California, this 28th day of March, 1928.

RODNEY H. MARCHANT.
ALBERT E. JURS.